Oct. 19, 1954 J. W. EMIG 2,691,796
METHOD AND APPARATUS FOR MAKING VARIEGATED
PLASTIC SHEET MATERIAL
Filed Nov. 28, 1952 2 Sheets-Sheet 1
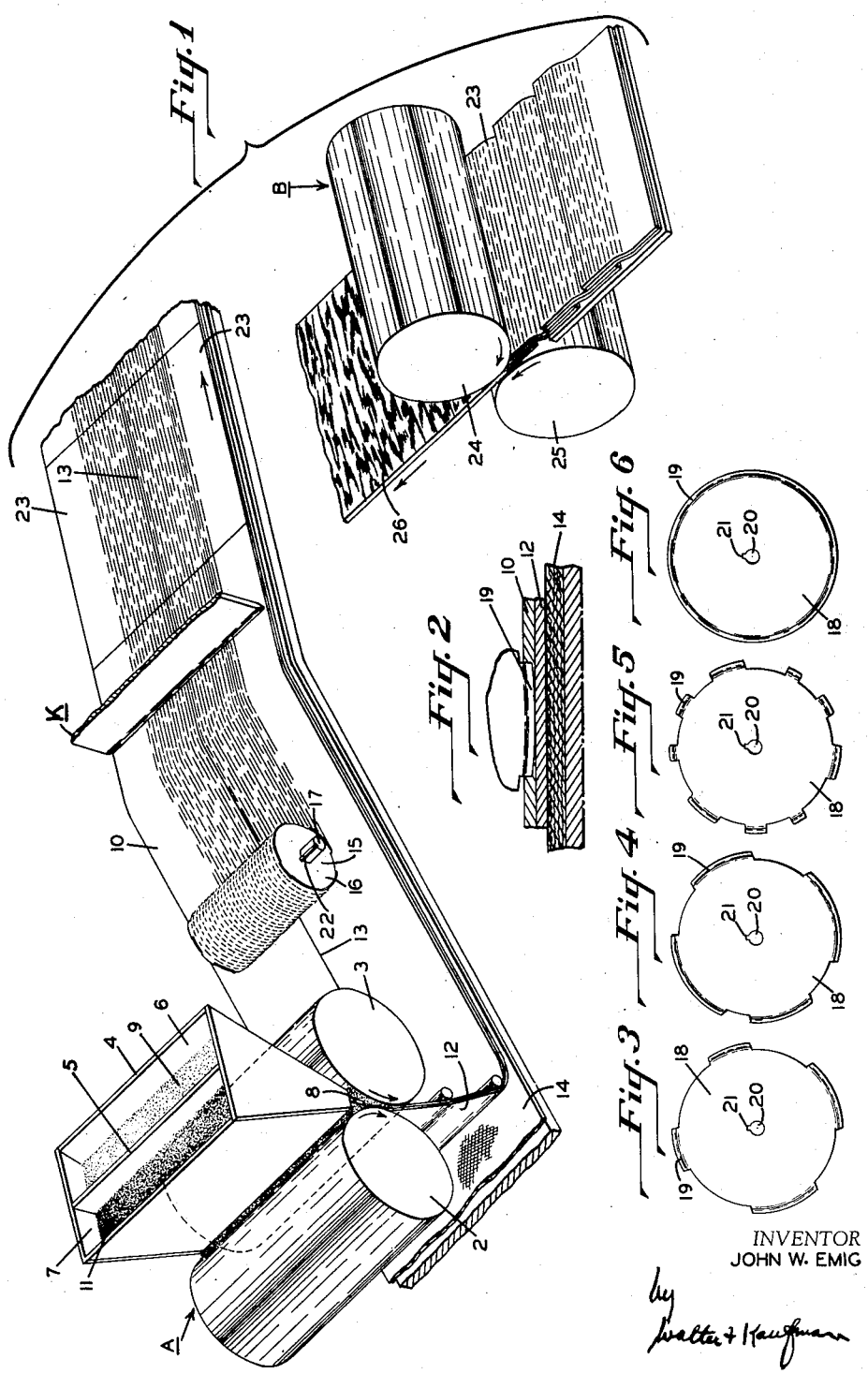
INVENTOR
JOHN W. EMIG
ATTORNEY

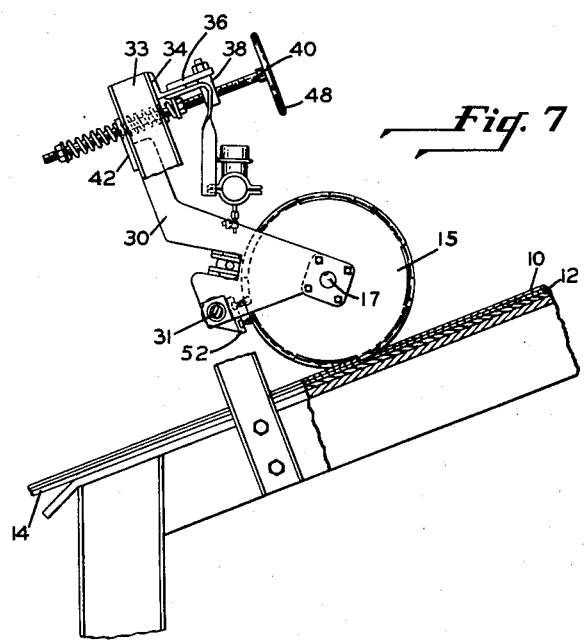
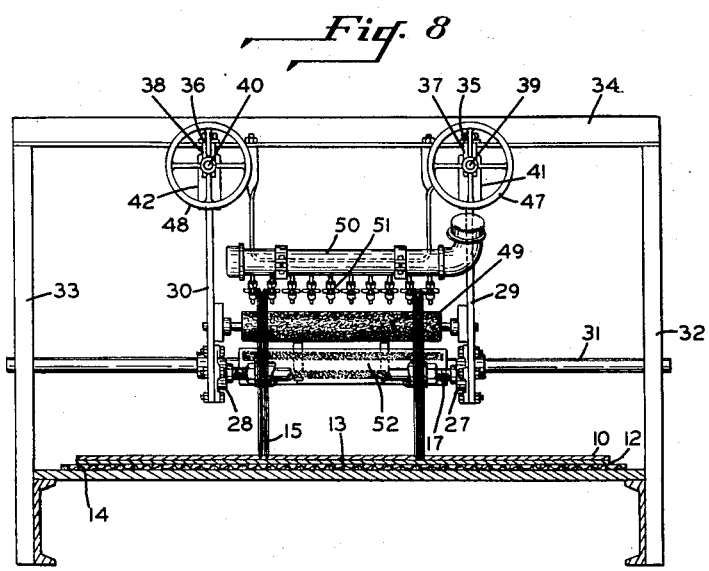

Patented Oct. 19, 1954

2,691,796

UNITED STATES PATENT OFFICE 2,691,796

METHOD AND APPARATUS FOR MAKING VARIEGATED PLASTIC SHEET MATERIAL

John W. Emig, Lancaster, Pa., assignor to Armstrong Cork Company, Lancaster, Pa., a corporation of Pennsylvania Application November 28, 1952, Serial No. 322,920

11 Claims. (Cl. 18—4)

This invention relates to a method and apparatus for making variegated plastic sheet material such as marble-grained linoleum, rubber composition, vinyl resin composition, and the like. The invention will be described with reference to the manufacture of marble-grained linoleum.

In the manufacture of marble-grained linoleum by the cross rolling of jaspé-grained sheets disposed in overlapping relationship as they are fed into the sheeting calender, the graining is fine lined and of cloudlike appearance. This type of graining is preferred by many decorators and users of linoleum, but there is a growing demand for a more striking or bolder graining, particularly by those who are concerned with surface coverings which will be used with the so-called modern decor.

An object of the present invention is to provide a method and apparatus for making variegated plastic sheet material having a new and more striking graining pattern than now customarily produced.

The capital invested in equipment for the manufacture of marble-grained linoleum is enormous, particularly in the high-speed "rotary" machines which are used both for the production of marble-grained inlaid or die cut patterns and for the production of plain marble-grained sheet goods which is not cut into patterned pieces but is laid as a continuous sheet upon a backing and is sold as such or is cut into tiles subsequent to curing or maturing of the linoleum composition.

With conventional marble-graining processes employed in the linoleum industry, there has always been a problem of eliminating or minimizing the change in character of graining which occurs at the line where each overlapped sheet joins its predecessor in movement through the sheeting calender. This disfiguration of the graining which is known as "hook-on" is particularly objectionable in sheet goods; in inlaid patterned goods, the separating inlays which may be of plain colors tend to obscure the "hook-ons."

A further object of the invention is to provide a method and apparatus for making a variegated plastic sheet material which will eliminate "hookons" substantially completely, making the process and apparatus especially useful in the production of plain marbelized sheet goods which may be severed into individual tiles or may be installed in large sheets.

Other objects of the invention will be apparent from consideration of the description of an embodiment of the invention which follows.

According to the method of the present invention, a body of plastic color composition such as linoleum is formed with a multiplicity of spaced slitted openings which extend from the upper face, through a substantial portion of the thickness of the body. The body is preferably jaspé grained; such graining may be obtained in the conventional manner by calendering a mass of intermixed granules of linoleum compositions of different color characteristics, such as two or more shades of brown color, for instance. The slitted body is then fed between a pair of calender rolls, preferably in the form of overlapped sheets which are directed into the calender substantially at right angles to the direction of the length of the slits. This calendering operation effects an irregular breaking through of the color composition from the lower portion of the body into the upper or face portion, through the slits which are opened and distorted in the calendering operation. There results an irregularly grained multicolored pattern in the finished sheet. Preferably the body is formed in the nature of a sheet having a jaspé-grained facing layer and plain or jaspé-grained backing layer differing from the facing layer in color characteristics, and the slitted openings extend through at least substantially the entire thickness of the facing layer. Preferably, in order to utilize equipment which is available in the linoleum industry, the facing and backing layers are integrally formed on a two-roll calender, the feeding hopper of which is divided longitudinally to receive the composition for the backing layer on one side and the composition for the facing layer on the other side of the dividing partition. In a modification of the invention, both the facing and backing portions are each of a single color, as, for instance, a tan facing portion with a brown backing portion. When the facing layer is slitted as described above and the slitted sheets are cross rolled in overlapping relationship, a bold graining pattern is obtained, free of objectionable "hook-ons."

The apparatus of the invention includes a new combination having a two-roll blanket calender and a sheeting calender, with a rotary slitter interposed between the two for forming a plurality of spaced slitted openings in a body of plastic color composition formed on the blanket calender, the sheeting calender receiving the slitted sheets in cross-rolling relationship for production of a grained product. The apparatus also includes a novel slitting mechanism.

In order that the invention may be fully understood, an embodiment thereof will be described in conjunction with the attached drawings, in which:

Figure 1 is a diagrammatic view illustrating the practice of the method of the invention in the manufacture of a marble-grained linoleum;

Figure 2 is a detailed sectional view illustrating the severance of the facing layer in carrying out the process;

Figures 3 to 6 are plan views of individual slitting cutters removed from the arbor shown in Figure 1;

Figure 7 is a side elevational view, partially broken away, illustrating the slitting mechanism; and Figure 8 is a front elevational view of the mechanism shown in Figure 7.

Referring to Figure 1, there is diagrammatically shown equipment suitable for carrying out the process of this invention. At the left in Figure 1 there is shown a two-roll blanket calender A including rolls 2 and 3. Disposed above this calender is a hopper 4 which is divided longitudinally by a partition 5 into two compartments 6 and 7 extending along the axis of the calender rolls 2 and 3 projecting as indicated at 8 into the nip between the calender rolls. Disposed in the hopper 4 in the forward compartment 6 thereof is a mass 9 of granules of linoleum composition for forming the facing layer 10 of a so-called blanket. In compartment 7 there is disposed a mass of granules of linoleum composition 11 for forming the backing layer 12 of the blanket.

As a typical example, the composition for the facing layer may be composed of conventional scratched linoleum composition in the form of small granules of five different colors or color shades as follows:

| | Parts |
|---|---|
| Light tan | 1¼ |
| Medium tan | 5 |
| Dark tan | 1½ |
| Brown | 1⅓ |
| Blue | ⅔ |

The blue is an accent color and only a minor proportion of it is incorporated. The remaining components are essentially all similar in color, but each has different color characteristics.

The backing layer may be made from a mass of scratched linoleum composition in the form of granules, the colors of which may be the same as those of the facing layer but preferably in different proportioning to provide for different color characteristics in the two layers. For instance, the composition 11 for the backing layer may be made up as follows:

| | Parts |
|---|---|
| Dark tan | 9 |
| Light tan | 4½ |

In Figure 1 the two layers have been shown separate and distinct for purposes of diagrammatic illustration. In actual practice with a divided color hopper feeding into a blanket calender there will be no perceptible line of demarcation between the backing and facing portions, the granules constituting the same being amalgamated. The sheet formed on the blanket calender between rolls 2 and 3 may be about .120" thick and about 40" wide and of indefinite length. The facing portion 10 and the backing portion 12 will each be about .060" thick. The formed sheet is severed longitudinally along the line 13 by a rotary cutter which is not visible in the drawing. It is a conventional cutter and needs no special description. The severed sheet is supported on a belt conveyor 14 which moves the sheet in the direction of the arrow.

Mounted above the conveyor 14 is a slitter 15 which is made up of a plurality of slitting knives 16 keyed to a mandrel 17. In the embodiment illustrated there are thirty-two slitting knives on the mandrel 17. Individual slitting knives are shown in Figures 3 to 6. Each includes a central body portion 18. Most of the slitters have projecting cutting segments 19 disposed in the periphery. Each has a central opening 20 provided with a keyway 21 to receive a key 22 fitted into the mandrel 17 and shown in Figure 1. It will be observed by reference to Figures 3 to 5 that the projecting cutting segments or portions 19 are preferably offset with respect to one another and are of different circumferential lengths to provide for the formation of irregularly disposed spaced slits of nonuniform lengths extending generally parallel to the direction of movement of the sheet. Figure 6 shows a cutter in which the cutting portion 19 is effective for severing a continuously extending slit in the sheet. Two of these are preferably provided on each side of the line of severance 13. They serve to provide a graining which extends throughout the width of the finally formed sheet in a manner hereinafter to be explained.

As will be observed by reference to Figure 2, the slitters are so disposed with respect to the conveyor 14 that the projecting cutting segments 19 extend substantially completely through the facing layer 10 to the backing layer 12. This may be varied, of course, depending upon the graining desired. With a jaspé-grained sheet as described above, good graining results if the facing layer is fully penetrated by the slitters. If the slitters extend into the backing layer and there is a substantial contrast in color characteristics between the two layers, a different graining pattern will result. The graining is bold and striking. Where there is but one jaspé layer formed on the blanket calender A as noted previously, the slitting should extend well into the body, below the upper surface to provide the desired graining pattern, but here also wide latitude in the depth of penetration is permissible.

The slit sheet is next cut into sections which in the embodiment illustrated may be about 78" long. This may be accomplished by the knife K shown in Figure 1. These sheets are then separated along the parting line 13 into segments 23 which are then fed in overlapping cross-rolling relationship to a sheeting calender B having rolls 24 and 25 for consolidation of the material. In the diagrammatic showing of Figure 1, the segments 23 cut from the slitted sheet are disposed in overlapping relationship in two thicknesses. This may be varied, depending upon the graining desired. Particularly good results are achieved where the sheets are overlapped to such an extent that the mass entering the nip between the rolls 24 and 25 will be about .550" thick and will be reduced to a sheet about .065" thick. This calendering step is essential, and equivalent results cannot be achieved by the application of static pressure as in a flat bed press. Since the sheets are overlapped, it is necessary only to slit that portion thereof which is exposed for engagement with the face-forming roll 24 of the sheeting calender B. Preferably, the band of slitting is extended to a somewhat greater extent as indicated in Figure 1 in order to insure that the entire surface exposed to the face-forming roll will be slitted, even though there may be some misalignment of the sheets as they are fed by hand in overlapping relationship into the calender. In making heavy thickness linoleum tiles, two of the sheets formed in the manner described may be plied together prior to entrance into a finishing calender where the two plies are consolidated, preferably onto a backing such as cotton duck, and the product delivered to a stove for curing of the linoleum mix in the conventional manner. After curing, the backing may be removed and the cured linoleum sheet severed into tiles. In inlaid linoleum manufacture the uncured but grained linoleum sheet from the sheeting calender B may be fed to a rotary die and cut into inlays which will be laid upon a backing of burlap, asphalt saturated felt, or the like. The backing with the inlays on it then will be delivered to the finishing calender, the product cured, if necessary, and the finished product trimmed to width and rolled up for sale.

Where the facing layer 10 is jaspé grained, the cross-rolling at the sheeting calender B will produce a marble graining of a striking and bold character because of the breaking through of the color composition of the backing layer 12 through the slitted openings provided in the facing layer 10, the slits being opened and distorted in the calendering operation. This graining has been diagrammatically illustrated at 26 in Figure 1.

While it is preferred to have the facing and backing layers each formed of a plurality of jaspé-grained colors, novel effects can be obtained where the facing and backing layers are of single colors or different shades or values of the same color. For instance, the facing portion 10 may be of a light tan and the backing portion 12 of brown, and a novel graining effect will be obtained by practice of the invention.

Very attractive graining can be obtained by feeding granules of two or more colors to the two-roll blanket calender to form a jaspé-grained sheet which is slitted through a substantial portion of its thickness by the slitter 15. A novel graining, free of any objectionable "hook-ons," is produced when such a slitted sheet is fed in overlapping cross-rolling relationship to the sheeting calender B and the composition of the lower portion of the sheet is irregularly broken through the facing portion. More than two layers of different color characteristics may be employed. For example, the hopper for the blanket calender A may be provided with two partitions and three separate batches of granulated mix fed thereto to form a sheet composed of three layers. This sheet may be slitted through the upper two layers and then cross rolled in the sheeting calender B as in the embodiment described.

In place of irregularly staggered cutting segments on the slitting knives, they may each be arranged to slit along continuous lines as does the cutter of Figure 6. With closely spaced slits, say one-fourth of an inch apart, a unique graining pattern is obtained. Variation from the generally random distribution of slits produced by the cutters of Figures 1 to 5 to the practically uniform slitting which will be obtained if all of the cutters are as shown in Figure 6 will produce graining patterns of different character and each may be modified to meet the demands of the public by proper selection of color characteristics, proportioning of colors, and the other variable factors mentioned above.

The slitter and its mounting arrangement are shown in detail in Figures 7 and 8. The mandrel 17 is mounted in bearings 27 and 28 secured to adjusting brackets 29 and 30 which are pivoted to a cross shaft 31 which is fixed in the generally vertical machine frame members 32 and 33. An angle 34 forms part of the frame and extends transversely of the frame members 32 and 33. Attached to angle 34 are brackets 35 and 36 which carry threaded blocks 37 and 38 which receive adjusting screws 39 and 40. Plates 41 and 42 are secured to the brackets 29 and 30 and are drilled to receive the adjusting screws therethrough. Each screw is provided with a pair of springs 43 and 44, shown in Figure 7, disposed on opposite sides of plate 42 (and also plate 41) and held in position by nuts 45 and 46. Movement of handwheels 47 and 48 attached to the adjusting screws will effect pivotal movement of the brackets 29 and 30 which carry the slitter. This makes possible minute adjustment of the slitter to insure proper depth of cut of the slits in the sheet delivered from the blanket calender on the conveyor belt 14. With tough compositions such as vinyl resin compounds, it may be desirable to deliver the sheet to be slitted over a supporting roll and to effect slitting in the zone where the sheet is backed up by the roll rather than the conveyor belt 14.

A felt-covered idler roll 49 is positioned to lie in engagement with the cutters 16, and a compound such as alcohol is deposited on this roll from a header 50 feeding a plurality of drip cups 51. This serves to keep the linoleum composition from adhering to the cutters 16. A brush block 52 is mounted on the pivot shaft 31, and the bristles of the brush are disposed to pass between the spaced cutters 16 and also aid in keeping them clean.

The invention is not limited to the manufacture of linoleum which, as mentioned in the forepart of this specification, has been used as typical of many plastic compositions which may be employed in the practice of the method and utilization of the apparatus.

I claim:

1. In a method of making variegated plastic sheet material, the steps comprising: forming a body of plastic color composition, the color characteristics of the upper surface of said body differing from the color characteristics in another portion of the body below the surface; forming a multiplicity of spaced slitted openings in the body extending from the upper surface at least substantially to said other portion of the body below the surface; and calendering said body at at a substantial angle to the length of at least some of said slitted openings to effect an irregular breaking through of color composition from said other portion into the upper surface of said body through said slitted openings to form an irregularly grained and multicolored pattern.

2. In a method of making variegated plastic sheet material, the steps comprising: forming a facing layer of plastic color composition with a multiplicity of slitted openings which extend at least substantially completely therethrough, feeding said layer with a backing layer of plastic color composition of different color characteristics between a pair of calender rolls, and there consolidating said composition layers and effecting an irregular breaking through of color composition from said backing layer into said facing layer through said slitted openings to form an irregularly grained multicolored pattern in said sheet material.

3. In a method of making variegated plastic sheet material, the steps comprising: forming a sheet of plastic color composition having a facing portion and a backing portion each of different color characteristics, forming a multiplicity of slitted openings in said facing portion, and consolidating said sheet by calendering the same with the direction of movement of said sheet through the calender being at a substantial angle to the length of at least some of said slitted openings to effect an irregular breaking through of color composition from said backing portion into said facing portion through said slitted openings to form an irregularly grained multicolored pattern in said sheet material.

4. In a method of making variegated plastic sheet material, the steps comprising: forming a plurality of sheets of plastic color composition, the color characteristics of the upper surface of said sheets differing from the color characteristics in another portion thereof below the upper surface; forming a multiplicity of spaced slitting openings in said sheets extending from the upper surface at least substantially to said other portion of the sheets below the upper surface; and calendering a pack of said sheets disposed in overlapping relationship with said slitted openings disposed toward the face-forming roll of the calender to effect an irregular breaking through of color composition from said other portion into the upper surface of said calendered sheet through said slitted openings disposed toward said face-forming roll to form an irregularly grained and multicolered pattern.

5. In a method of making variegated plastic sheet material, the steps comprising: forming a composite body of plastic color composition including a backing portion of jaspé graining and an integral facing portion of jaspé graining, the color characteristics of which differ from those of the backing portion; forming a multiplicity of slitted openings in said body, a substantial number at least of which are disposed generally parallel to the direction of said jaspé graining and extend from the upper surface of said facing portion at least substantially to said backing portion; cutting said composite body into strips with the jaspé graining extending generally parallel to the length thereof; and feeding said strips in overlapping cross-rolling relationship to a sheeting calender to consolidate said strips and effect an irregular breaking through of said color composition from said backing portion into said facing portion and to break up said jaspé graining and form an irregularly grained multicolored pattern in said sheet material.

6. In a method of making variegated plastic sheet material, the steps comprising: those of claim 1 in which the body of plastic color composition formed in the first step is jaspé grained in the upper surface and body portion below the surface.

7. In a method of making variegated plastic sheet material, the steps comprising: those of claim 2 in which at least one of said facing and backing layers is jaspé grained.

8. In a method of making variegated plastic sheet material, the steps comprising: those of claim 3 in which at least one of said facing and backing portions is essentially plain colored.

9. In an apparatus for making variegated plastic sheet material, the combination of: a blanket calender for forming a body of plastic color composition, the color characteristics of the upper surface of said body differing from the color characteristics in another portion of the body below the surface; a multiple blade slitter positioned to engage the sheet formed on said blanket calender to form a multiplicity of spaced slitted openings in the body extending from the upper surface at least substantially to said other portion of the body below the surface; means for severing said sheet transversely of its length into sections; a sheeting calender to effect an irregular breaking through of color composition from said other portion into the upper surface of said body through said slitted openings; and means for supporting said sections of said sheet in overlapping relationship for delivery into said sheeting calender, with the slitted openings exposed for engagement with the face-forming roll of said calender and disposed for cross rolling at a substantial angle to the length of at least some of said slitted openings.

10. In an apparatus for making variegated plastic sheet material, the combination of: a blanket calender for forming a longitudinally grained body of plastic color composition, the color characteristics of the upper surface of said body differing from the color characteristics in another portion of the body below the surface; a multiple blade slitter positioned to engage the sheet formed on said blanket calender to form a multiplicity of spaced slitted openings in the body extending partially therethrough from the upper surface at least substantially to said other portion of the body below the surface, with at least some of said slits being disposed generally parallel to the direction of graining; means for severing said sheet transversely of its length into sections; a sheeting calender to effect an irregular breaking through of color composition from said other portion into the upper surface of said body through said slitted openings; and means for supporting said sections of said sheet in overlapping relationship for delivery into said sheeting calender in cross-rolling relationship, with slitted openings in the overlapped section exposed for engagement with the face-forming roll of said calender and with the length of at least some of said slits being substantially parallel to the axis of said sheeting calender.

11. In a method of making variegated plastic sheet material, the steps comprising: forming a body of plastic color composition the upper surface of which has a generally longitudinally directed graining differing in character from the graining in another portion of the body below the upper surface; forming a multiplicity of spaced slitted openings in the body extending partially therethrough from the upper surface thereof; overlapping a plurality of said sheets with the slitted openings in the overlapped sections exposed; and forming a smooth-surfaced, irregularly grained, multicolored surface covering by calendering such overlapped sheets with said slitted openings directed toward the face-forming roll of said calender to effect an irregular breaking through of color composition from said other portion into the upper surface of said body through said slitted openings, said calendering being effected at a substantial angle to the length of at least some of said slitted openings.

References Cited in the file of this patent

UNITED STATES PATENTS

| Number | Name | Date |
|---|---|---|
| 569,187 | Flood | Oct. 13, 1896 |
| 878,472 | Steele | Feb. 4, 1908 |
| 1,650,193 | Daykin | Nov. 22, 1927 |
| 2,243,736 | Loblein | May 27, 1941 |
| 2,260,453 | Hartman | Oct. 28, 1941 |
| 2,304,759 | Carroll | Dec. 8, 1942 |
| 2,310,495 | Summergill | Feb. 9, 1943 |
| 2,369,866 | Spencer | Feb. 20, 1945 |
| 2,588,859 | Lumbard | Mar. 11, 1952 |